United States Patent [19]

van Dijen et al.

[11] Patent Number: 5,756,409
[45] Date of Patent: May 26, 1998

[54] SILICON-CARBIDE SINTERED ABRASIVE GRAIN AND PROCESS FOR ITS PRODUCTION

[75] Inventors: Franciscus van Dijen, Dettighofen; Edgar Mayer, Küssaberg, both of Germany

[73] Assignee: Korund Laufenburg, GmbH, Laufenburg, Germany

[21] Appl. No.: 734,489

[22] Filed: Oct. 21, 1996

Related U.S. Application Data

[63] Continuation of Ser. No. 189,675, Feb. 1, 1994, abandoned.

[30] Foreign Application Priority Data

Feb. 4, 1993 [CH] Switzerland ................ 344/93

[51] Int. Cl.$^6$ .................. C04B 35/565; C04B 35/64
[52] U.S. Cl. ................ 501/89; 501/91; 501/92; 501/93; 501/152; 264/65; 423/345; 423/440; 51/307; 51/309; 51/293
[58] Field of Search .................. 501/88, 89, 91, 501/92, 93, 152; 423/439, 440, 345; 264/65; 51/307, 309, 293

[56] References Cited

U.S. PATENT DOCUMENTS

| | | | |
|---|---|---|---|
| 3,649,310 | 3/1972 | Yates | 106/44 |
| 4,230,497 | 10/1980 | Schwetz et al. | 501/89 |
| 4,354,991 | 10/1982 | Suzuki et al. | 501/89 |
| 4,502,983 | 3/1985 | Omori et al. | 501/89 |
| 4,569,921 | 2/1986 | Omori et al. | 501/88 |
| 4,681,861 | 7/1987 | Saito et al. | 501/89 |
| 4,729,972 | 3/1988 | Kodama et al. | 501/91 |
| 4,829,027 | 5/1989 | Cutler et al. | 501/89 |
| 5,298,470 | 3/1994 | Chia et al. | 501/89 |

FOREIGN PATENT DOCUMENTS

| | | | |
|---|---|---|---|
| 300288 | 6/1992 | Germany | C04B 35/56 |
| WO 91/06515 | 5/1991 | WIPO | |

*Primary Examiner*—Michael Marcheschi
*Attorney, Agent, or Firm*—Jerry Cohen

[57] ABSTRACT

Abrasive grain with significantly improved toughness is obtained by pressureless sintering of α-silicon carbide powder with oxidic sinter additives, especially aluminum oxide/yttrium oxide, which is also suitable for those applications where an ordinary silicon carbide abrasive grain is too brittle.

10 Claims, No Drawings

SILICON-CARBIDE SINTERED ABRASIVE GRAIN AND PROCESS FOR ITS PRODUCTION

This is a continuation of application Ser. No. 08/189,675, filed 1 Feb. 1994.

BACKGROUND OF THE INVENTION

1. Field of the Invention

The invention relates to a silicon carbide-based abrasive grain that can be produced by sintering silicon carbide powder with oxidic sinter additives, as well as a process for its production.

2. Prior Art

Because of its great hardness, silicon carbide has widely been used as an abrasive grain since it began to be produced industrially according to the Acheson process. The silicon carbide that accumulates in the Acheson furnace in the form of large crystals, which measures from several mm to several cm, is brought to the desired grain size for this purpose by breaking and screening, which is quite expensive and yields a broad range of different grain sizes, even if only certain grain sizes are needed. This factor easily leads to an excess of less popular grain sizes, which are unsalable or can be sold only at low prices. The relatively low toughness of the thus produced SiC abrasive grain which, expressed as a $K_{IC}$ value, is about 3 $MPa \cdot m^{1/2}$ can be mentioned as a significant technical drawback to it. The effect of this is that silicon carbide, despite its great hardness, is not suitable for all grinding tasks, and is used in the machining of several materials by abrasives of lower hardness, but higher toughness.

An abrasive that combines the great hardness of the Acheson silicon carbide with a significantly improved toughness, and which, thus, can also be used for grinding tasks for which other abrasives are still commonly being used, would therefore be desirable.

Sintered materials based on silicon carbide are known which can be obtained by sintering silicon carbide powder with additives containing boron and carbon. The toughness of these materials corresponds, however, to approximately that of ordinary Acheson silicon carbide, so that using them as abrasives provides no special technical advantages and would also be uneconomical because of the higher cost.

BROAD DESCRIPTION OF THE INVENTION

The main objective of the invention is to provide an abrasive grain based on silicon carbide with great hardness and significantly improved toughness. Other objectives and advantages of the invention are set out herein or are obvious herefrom to one skilled in the art.

The objectives and advantages of the invention are achieved by the abrasive grain of the invention and the production process of the invention.

The invention involves silicon carbide-based sintered abrasive grain, which can be obtained by pressureless sintering of silicon carbide powder, if appropriate with the addition of other carbides, nitrides, borides or high-melting metals, with at least one sinter additive which are oxides, double oxides and mixed oxides of aluminum, magnesium and rare earths, at 1700° to 2200° C. Preferably the sinter additive is a mixture of aluminum oxide and magnesium oxide or at least one rare earth oxide and/or a corresponding double or mixed oxide. Preferably the sinter additive is a mixture of aluminum oxide and yttrium oxide and/or a corresponding double oxide. Preferably the sintered abrasive grain has a Vickers microhardness of at least 22 GPa and a fracture toughness $K_{IC}$ of at least 5 $MPa \cdot m^{1/2}$.

The invention also involves a process for the production of sintered abrasive grain based on silicon carbide. The process includes mixing silicon carbide powder, if appropriate with the addition of other carbides, nitrides, borides or high-melting metals, with at least one sinter additive which are oxides, double oxides and mixed oxides of aluminum, magnesium and rare earths and/or corresponding precursor compounds, which upon heating turn into the above-mentioned oxides, double oxides or mixed oxides, consolidating the mixture, and sintering pressurelessly the mixture at 1700° to 2200° C. under protective gas.

Preferably the sinter additive is a mixture of aluminum oxide and magnesium oxide or at least one rare earth oxide and/or a corresponding double or mixed oxide. Preferably the sinter additive is a mixture of aluminum oxide and yttrium oxide and/or a corresponding double oxide. Preferably the mixing is performed in a suspension in a device which is a colloid mill, an attritor, an agitating ball mill, an annular mill or a vibratory mill, and the suspension is then dried. Preferably the mixing is performed simultaneously with the crushing and/or deagglomeration of the silicon carbide. Preferably the consolidation of the mixture of silicon carbide powder and sinter additivies is performed by dry pressing and the mass thus-compressed is then crushed to abrasive grain size.

DETAILED DESCRIPTION OF THE INVENTION

It has been found that silicon carbide powder can be sintered with oxidic sinter additives under normal pressure, i.e., "pressurelessly," at 1700° to 2200° C. to produce hard and tough abrasive grain. A powder that can be obtained by grinding ordinary Acheson silicon carbide ($\alpha$-SiC) can be used as the silicon carbide powder. Powder made from $\beta$-SiC can also be used.

Other hard materials (in particulate or powder form) can, if desired, be added to the silicon carbide powder. The other hard materials include other carbides, such as, boron carbide or titanium carbide, nitrides, such as, titanium nitride, tantalum nitride, boron nitride or aluminum nitride, borides, such as, titanium diboride or zirconium diboride, and high-melting metals, such as, tungsten.

Oxides, double oxides, or mixed oxides of aluminum, magnesium or rare earths or mixtures of the above-mentioned compounds (in particulate or powder form) can be used as suitable sinter additives. In this connection, double oxides are defined as stoichiometric-composition or approximately stoichiometric-composition oxidic compounds of two or more metals with separate crystal structures, for example, spinels, garnets or perovskites. Mixed oxides are defined as oxidic compounds of two or more metals, which are derived from a pure metal oxide by substitution of a portion of the metal atoms by atoms of one or more other metals, without the structure being changed, i.e., mixed crystals or solid solutions. Rare earths are defined here as the metals scandium, yttrium, lanthanum, and the lanthanides, as well as their mixtures.

Preferred sinter additives are mixtures of aluminum oxide with magnesium oxide or at least one rare earth oxide as well as the corresponding double or mixed oxides, such as, spinels or garnets.

A mixture of aluminum oxide and yttrium oxide or a corresponding compound, such as, yttrium aluminum garnet (YAG; $Y_3Al_5O_{12}$), is especially preferred as the sinter additive. Especially good results were achieved with a mixture of $Al_2O_3$ and $Y_2O_3$ at a ratio by weight of 3:2 (corresponding to a molar ratio of about 3.3:1).

The abrasive grain of the invention has a Vickers microhardness of preferably at least 22 GPa and a fracture toughness $K_{IC}$ of at least 5 MPa·m$^{1/2}$. Typical values are a hardness of about 25 to 27 GPa and a fracture toughness of about 6 MPa·m$^{1/2}$.

The abrasive grain of the invention can be produced by pressurelessly consolidating and sintering silicon carbide powder, preferably that of the α-modification, mixed, if appropriate, with the above-mentioned other carbides, nitrides, borides, or metals, and the sinter additives, at 1700° to 2200° C. under protective gas. Instead of the oxides, double oxides or mixed oxides mentioned above, appropriate precursor compounds, such as, hydroxides or salts with volatile inorganic or organic acids, i.e., for example, nitrates, carbonates or acetates, can also be used if appropriate. Before the sintering temperature is reached, these precursor compounds decompose to the corresponding oxides, which then act as actual sinter additives.

The mixing can be performed dry or preferably wet, i.e., in suspension. Water, if appropriate with the addition of common auxiliary agents, such as, liquefiers, foam separators or pH regulators, is preferably used as the suspending agent. It has been found that especially good results are achieved in a mildly alkaline aqueous suspension with a pH of about 8 to 11. To adjust the pH, for example, ammonia solution or an amine can be added. It is also possible to use organic liquids, for example, alcohols, as the suspending agent. Other auxiliary agents, such as, lubricants (for better compression, if the process is carried out by pressing) or temporary binders (to ensure sufficient strength before sintering), are also advantageously added in this process step.

The mixing process is preferably performed in a colloid mill, an attritor, an agitated ball mill, an annular mill, or a vibratory mill. Especially preferred are attritors and agitated ball mills, especially ones with grinding media made of silicon carbide.

It is especially advantageous to perform the mixing in such a way that agglomerates present simultaneously in the silicon carbide powder or the other solid starting materials are destroyed and any large particles present are crushed. This can be done, for example, in such a way that the pulverizing necessary for the production of the silicon carbide powder from α-SiC is performed simultaneously with the mixing in the same process step.

After mixing, it is advantageous to consolidate the mixture or the suspension to obtain a "green body" that can be sintered. The suspension can be filtered for this purpose, for example, and the filter cakes obtained can be dried. The dried filter cakes can then, if appropriate after an additional compression by dry pressing, be crushed to the desired abrasive grain size. The crushing can be performed, for example, with a rolling crusher and involves neither great energy expenditure nor great wear, in contrast to the crushing of Acheson silicon carbide in the production of ordinary SiC abrasive grain. The suspension can, if it already has a high solid content, also be dried directly without a separate filtration step.

In the case of crushing, the contraction that occurs during sintering is taken into consideration. Undesired fines can be screened out and fed back to the process.

The suspension can also be spray-dried, so that a flowable granulate is obtained that can be compressed, for example, by dry pressing. Using appropriate pressing tools, abrasive grains of defined shape can thus also be produced.

It is appropriate for sintering to be carried out under protective gas at 1700° to 2200° C., preferably at 1800° to 2200° C. Nitrogen or a noble gas can be used as a protective gas, for example; argon is preferred.

The duration of sintering is dependent on temperature, type and amount of the additives and the sintering atmosphere; it is, for example, about 2 hours at 1900° C. with $Al_2O_3/Y_2O_3$ in an argon atmosphere.

The sintering can be performed both in a powder bed and without it. After sintering, agglomerates that have developed are, if appropriate, broken open and the abrasive grain is brought to the desired grain size distribution by screening.

The following examples illustrate the production of the abrasive grain of the invention, without being regarded as being restricted to the embodiments described.

EXAMPLE 1

In an agitated ball mill (net volume 12.5 l) with a circulation vessel, 50 kg of black α-SiC powder (type UFB-10 of the Lonza-Werke GmbH, Waldshut, Germany, specific surface 10 m$^2$/g), 3.33 kg of aluminum oxide powder (type CS 400, Martinswerk GmbH, Bergheim/Erft, Germany) and 2.22 kg of yttrium oxide powder (H. C. Starck, Goslar, Germany) were mixed in 50 l of desalinated water for 8 hours. 25 kg of silicon carbide balls with a 2 mm diameter was used as a grinding medium. 0.5 kg of a soap-based dispersing agent, 0.5 kg of an amino alcohol (as a base) and 0.25 kg of silicon foam separator were added to the suspension. The suspension was dried in a layer 30 mm thick at 100° C. for 24 hours. The solid mass thus obtained was crushed with a rolling crusher, and the grain fraction between 0.1 mm and 1.4 mm was screened out. These grains were sintered in a graphite crucible at 1900° C. under argon for 2 hours at normal pressure. After sintering, a P-36 grain size was screened out. The microhardness of the abrasive grain thus obtained was 26 GPa (on the Vickers scale), and the fracture toughness ($K_{IC}$) was 6 MPa·m$^{1/2}$.

EXAMPLE 2

In the agitated ball mill described in Example 1, the same charge as in Example 1 was mixed for 8 hours. Unlike in Example 1, 1 kg of polyethylene glycol (as lubricant) and 2 kg of polyvinyl alcohol (as a temporary binder) were also added. The suspension was then spray-dried, and the granulate thus obtained was pressed with a particle size of about 0.1 mm at a pressure of 100 MPa into plates measuring 90·90·20 mm$^3$. The plates were crushed with a rolling crusher, and the rest of the process steps were performed as described in Example 1. Abrasive grain with a hardness of 26 GPa and a fracture toughness of 6 MPa·m$^{1/2}$ was also obtained by this procedure.

What is claimed is:

1. A sintered abrasive silicon carbide grain as made by pressureless sintering with a sintering additive at 1700 to 2200 deg. C. and wherein the sinter additive is a mixture of aluminum oxide and an additional oxide selected from the group consisting of magnesium oxide, rare earth oxides and corresponding double and mixed oxides thereof and the sintered abrasive grain has a Vickers microhardness of at least 22 GPa and a fracture toughness $K_{IC}$ of at least 5 MPa m$^{1/2}$.

2. The sintered abrasive grain according to claim 1 wherein the sinter additive is a mixture of aluminum oxide and yttrium oxide and/or a corresponding double oxide.

3. Process for the production of sintered abrasive grain based on silicon carbide, comprising mixing silicon carbide powder, with at least one selected from the group consisting of oxides, double oxides and mixed oxides of aluminum, magnesium or rare earths or corresponding precursor compounds, which upon heating turn into the above-mentioned oxides, double oxides or mixed oxides, consolidating the mixture and, sintering pressurelessly the mixture at 1700° to 2200° C. under protective gas, to produce the properties set forth in claim 1.

4. The process according to claim 3 wherein the sinter additive is a mixture of aluminum oxide and an additional material selected from the group consisting of magnesium oxide, rare earth oxides and corresponding double and mixed oxides thereof.

5. The process according to claim 4 wherein the sinter additive is a mixture of aluminum oxide and yttrium oxide and/or a corresponding double oxide.

6. The process according to claim 3 wherein the mixing is performed simultaneously with crushing and/or deagglomeration of the silicon carbide.

7. The process according to claim 6 wherein the consolidation of the mixture of silicon carbide powder and sinter additives is performed by dry pressing the powders to form a compressed mass and the mass thus-compressed is then crushed to abrasive grain size.

8. The process according to claim 3 wherein the consolidation of the mixture of silicon carbide powder and sinter additives is performed by dry pressing and the mass thus-compressed is then crushed to abrasive grain size.

9. Abrasive grain as in claim 1 wherein the silicon carbide is admixed with at least one additional material selected from the group consisting of carbides, nitrides, borides, and high-melting metals and sintered therewith.

10. Process as in claim 3 wherein the silicon carbide is admixed with at least one additional material selected from the group consisting of carbides, nitrides, borides, and high-melting metals and sintered therewith.

* * * * *